US011967470B2

United States Patent

Liao et al.

(10) Patent No.: US 11,967,470 B2

(45) Date of Patent: Apr. 23, 2024

(54) METHOD AND DEVICE FOR DETERMINING CONTACT THICKNESS CHANGE OF A CONTACTOR

(71) Applicant: Rockwell Automation Technologies, Inc., Mayfield Heights, OH (US)

(72) Inventors: Junfeng Liao, Shanghai (CN); Benfeng Tang, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 405 days.

(21) Appl. No.: 17/465,152

(22) Filed: Sep. 2, 2021

(65) Prior Publication Data

US 2023/0061652 A1 Mar. 2, 2023

(51) Int. Cl.

*H01H 1/00* (2006.01)

*H01H 50/54* (2006.01)

(Continued)

(52) U.S. Cl.

CPC ........ *H01H 1/0015* (2013.01); *H01H 50/546* (2013.01); *H01H 73/045* (2013.01); *H01H 2071/044* (2013.01)

(58) Field of Classification Search

CPC ...... H01H 1/0015; H01H 50/08; H01H 50/54; H01H 50/546; H01H 2071/044;

(Continued)

(56) References Cited

U.S. PATENT DOCUMENTS 6,313,636 B1 * 11/2001 Pohl .................... H01H 1/0015 361/88

8,688,391 B2 4/2014 Elsner et al.

(Continued)

FOREIGN PATENT DOCUMENTS

CN 101813750 A * 8/2010 .......... G01R 31/327

CN 101813750 A 8/2010

OTHER PUBLICATIONS

Rockwell Automation publication titled "*IEC & NEMA Contactors, Your make-or-break industrial control choice*", Publication 300-BR001A-EN-P, Feb. 2021.

(Continued)

*Primary Examiner* — Jeffrey P Aiello

(57) ABSTRACT

A method for determining contact thickness change in a contactor includes sensing a first displacement distance moved by an armature of the contactor from a reference location to a first transition point during a switch-off operation of the contactor at a first contactor life reference time when movable contacts and fixed contacts of the contactor define a first contact thickness. The method further includes sensing a second displacement distance moved by the armature from the reference location to a second transition point during a switch-off operation at a second contactor life reference time that is after the first contactor life reference time when the movable and fixed contacts define a second contact thickness that is less than the first contact thickness. The first displacement distance and the second displacement distance are used to determine a contact thickness change between the first contact thickness and the second contact thickness. A contactor adapted to implement the method is also disclosed.

20 Claims, 6 Drawing Sheets

(51) Int. Cl.
*H01H 73/04* (2006.01)
*H01H 71/04* (2006.01)

(58) Field of Classification Search
CPC ...... H01H 73/04; H01H 73/045; H01H 35/02; G01P 15/00; G01P 15/18; G01P 3/50; G01P 3/42; G01P 3/00; G01P 3/44; G01P 21/00
USPC ........... 73/866; 257/21.53; 700/275; 702/34, 702/150, 188, 182, 189, 42, 33, 155, 170, 702/117, 104, 127, 65, 44, 158; 703/1, 3
See application file for complete search history.

(56) References Cited

U.S. PATENT DOCUMENTS

| | | | | |
|---|---|---|---|---|
| 2007/0008053 | A1* | 1/2007 | Mochizuki ........... | H01H 50/041<br>335/128 |
| 2008/0110732 | A1* | 5/2008 | Adunka ............... | H01H 1/0015<br>200/43.01 |
| 2018/0223943 | A1* | 8/2018 | Reuter ................ | F16K 31/0658 |

OTHER PUBLICATIONS

Vishay publication titled "*TCUT1300X01 Vishay Semiconductors*", Oct. 4, 2011.
Digikey publication titled "*A Designer's Guide to Encoders*", Apr. 19, 2012.
US Digital Motion Control Products publication titled "*EM1 Transmissive Optical Encoder Module*", Jun. 2, 2021.

* cited by examiner

10
C2
C1
C2a
C1a
C2b
C1b
G1
G2
F1
F2
F3
FC
D2
K
S
S1
S2
Fm
20
22
24
30
$T_0$
$T_1$
$T_2$

METHOD AND DEVICE FOR DETERMINING CONTACT THICKNESS CHANGE OF A CONTACTOR

BACKGROUND INFORMATION

Contactors are well-known electrical switching devices that are electrically controlled by an AC or DC control input to selectively connect a load such as a motor, lighting, motion control devices, HVAC equipment, or other electrical load to a source of electrical operating power. Contactors include fixed contacts and movable contacts. The movable contacts are operably connected to an armature and move with the armature between: (i) an opened position where they are spaced-apart from the fixed contacts to open the power circuit between the line side operating power and the load; and (ii) a closed position where they are engaged with the fixed contacts and complete the power circuit between the line side operating power and the load. The armature and movable contacts connected thereto are biased to a first position corresponding to the opened position of the movable contacts. A stator including a DC or AC operated coil is provided adjacent the movable armature and is selectively energized to provide an electromagnet that induces movement of the armature from its first position to a second position corresponding to the closed position of the contacts.

Over time, the repetitive opening and closing of the contacts and associated arcing leads to erosion of the movable and fixed contacts. This contact erosion can eventually become severe enough to cause the contactor to fail and be unable to reliably provide the operating power to the load. As such, contact erosion within a power contactor is a major factor that determines contactor life. Accordingly, monitoring and predicting contact erosion can be helpful for preventative maintenance of power contactors, and can decrease the likelihood of unplanned failures and outages caused by contactor failure by allowing maintenance personnel to repair or replace the contactor at an opportune time rather than on an emergency basis. Thus, a need has been identified for a new and improved method and device for monitoring contact erosion in a contactor and/or for monitoring the overall health of a contactor to provide improved reliability, safety, and predictability for contactors and systems controlled thereby.

BRIEF DESCRIPTION

In accordance with one aspect of the present disclosure, a method for determining contact thickness change in a contactor includes sensing a first displacement distance moved by an armature of the contactor from a reference location to a first transition point during a switch-off operation of the contactor at a first contactor life reference time when movable contacts and fixed contacts of the contactor define a first contact thickness. The method further includes sensing a second displacement distance moved by the armature from the reference location to a second transition point during a switch-off operation at a second contactor life reference time that is after the first contactor life reference time when the movable and fixed contacts define a second contact thickness that is less than the first contact thickness. The first displacement distance and the second displacement distance are used to determine a contact thickness change between the first contact thickness and the second contact thickness.

In accordance with another aspect of the present disclosure, a contactor includes a stator comprising a core and windings. An armature moves relative to the stator. Fixed contacts are fixed in position relative to the stator and movable contacts move with the armature relative to the stator. The movable contacts are also movable relative to the armature. The contactor includes a contact thickness change determination system comprising an electronic controller and a position sensor for sensing a position of the armature relative to the stator and providing armature position data to the electronic controller that indicates the position of the armature. The electronic controller is adapted to use the armature position data to determine a first displacement distance moved by the armature from a reference location to a first transition point during a switch-off operation of the contactor at a first contactor life reference time when the movable contacts and the fixed contacts of the contactor define a first contact thickness. The electronic controller is also adapted to use the armature position data to determine a second displacement distance moved by the armature from the reference location to a second transition point during a switch-off operation at a second contactor life reference time after the first contactor life reference time when the movable contacts and the fixed contacts define a second contact thickness that is less than the first contact thickness. The electronic controller is further adapted to use the first displacement distance and the second displacement distance to determine a contact thickness change between the first contact thickness and the second contact thickness.

DETAILED DESCRIPTION

Figure 1:
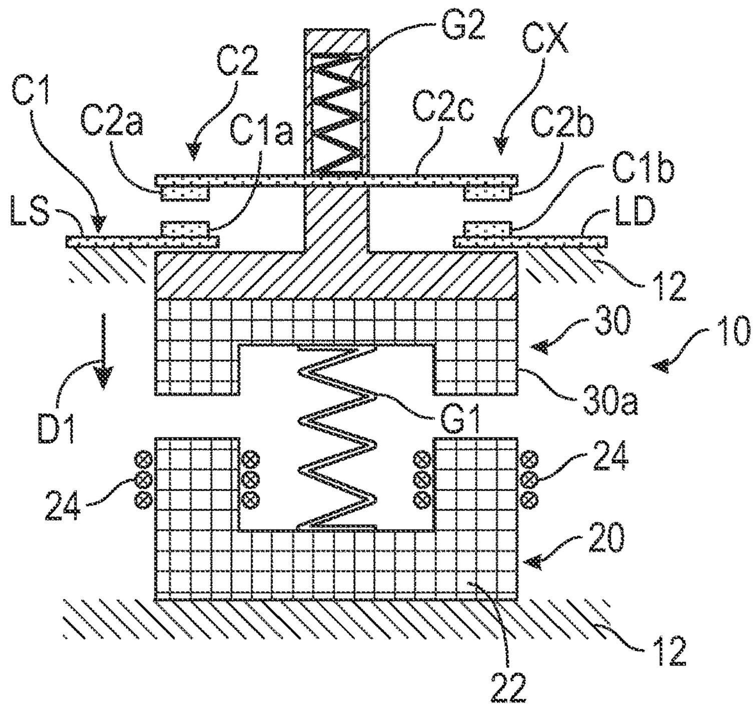
FIG. 1 shows a conventional power contactor in a first operative state sometimes referred to herein as its "opened" or "off" or "non-conducting" state.

FIG. 1 shows a conventional power contactor 10 in a first operative state sometimes referred to herein as its "opened" or "off" or "non-conducting" state. The contactor 10 comprises a base 12 that is mounted to a rail, machine, chassis, enclosure, or other associated support structure. The base 12 can be defined by and/or provided as part of a contactor enclosure such as a polymeric and/or metallic contactor housing. A stator 20 is connected to the base 12 and comprises a core 22 such as a solid core or a laminated core of a ferromagnetic material such as iron. A coil 24 comprising electrically conductive windings such as copper conductors is wound around the core 22 (the coil 24 is shown in section). The stator 20 thus comprises and provides an electromagnet that is selectively activated when the coil 24 is selectively energized with AC or DC electrical power and that is deactivated with the coil 24 is de-energized. The overall stator 20 including the core 22 and coil 24 is sometimes generally referred to as a "coil."

Figure 2:
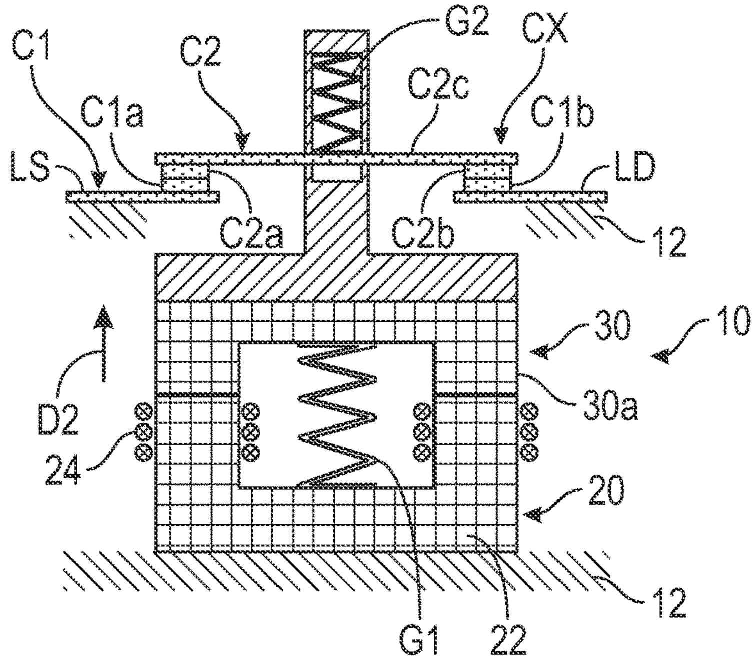
FIG. 2 shows the contactor or FIG. 1 in a second operative state sometimes referred herein to as its "closed" or "on" or "conducting" state.

A movable armature 30 is movably supported adjacent the stator 20 and moves relative to the stator 20 between a first position (FIG. 1) where the armature 30 is relatively spaced-apart from the stator 20 and a second position (FIG. 2) where the armature 30 is abutted and in contact with the stator 20. The armature 30 moves in a first direction D1 from the first position toward the second position and moves in an opposite second direction D2 from the second position toward the first position. A return spring or armature spring G1 is operably engaged between the armature and the stator 20 (or another location that is fixed relative to the base 12) and continuously biases the armature 30 away from the stator 20 in the second direction D2 toward its first position. The armature 30 comprises a ferromagnetic material and is thus attracted and induced to move in the first direction D1 toward its second position when the coil 24 is energized.

The contactor 10 further comprises at least one set of contacts CX associated with an electrical power circuit including a load side LD and a source or line side LS. In another example, two, three, or more sets of contacts CX are provided as part of the contactor 10 and associated with respective power circuits. The set of contacts CX comprises a fixed contact portion C1 including first and second fixed contacts C1*a*,C1*b* that are immovably fixed in position relative to the base 12. As noted, one of the fixed contacts C1*a* is electrically connected to the load side LD of the power circuit and the other one of the fixed contacts C1*b* is electrically connected to the source or line side LS of the power circuit. The set of contacts CX further comprises a movable contact portion C2 including first and second movable contacts C2*a*,C2*b* that are each physically connected to and form a part of a movable conductive contact body or contact bar C2*c* that electrically and physically interconnects the first and second movable contacts C2*a*, C2*b*. The movable contacts C2*a*,C2*b* can be defined as part of the movable contact bar C2*c* or can be applied or otherwise connected to the movable contact bar C2*c*. The first fixed contact C1*a* and first movable contact C2*a* define a first contact pair C1*a*,C2*a*, and the second fixed contact C1*b* and second movable contact C2*b* define a second contact pair C1*b*,C2*b*.

The contact bar C2*c* or other part of the movable contact portion C2 is operably connected to the armature 30 for movement therewith in the first and second directions D1,D2 between the first and second positions of the armature 30 relative to the stator 20. The contact bar C2*c* or other part of the movable contact portion C2 is also movably connected to the armature 30, itself, such that the movable contact portion C2 is also movable relative to the armature 30 in the first and second directions D1,D2 between: (i) an extended position (FIG. 1) where the movable contact portion C2 is extended toward an inner end 30*a* of the armature 30 and toward the fixed contact portion C1; and (ii) a retracted position (FIG. 2) where the movable contact portion C2 is slightly retracted away from the extended position and away from the inner end 30*a* of the armature 30. A phase spring or contact spring G2 is operably connected between the armature 30 and the movable contact portion C2 and biases the movable contact portion C2 in the first direction D1 toward its extended position which minimizes contact bounce when the movable contacts C2*a*,C2*b* respectively engage the fixed contacts C1*a*,C1*b* and also allows the movable contact portion C2 to move in the second direction D2 relative to the armature 20 to absorb or accommodate movement of the armature 30 in the first direction D1 toward its second position after the movable contacts C2*a*,C2*b* respectively engage the fixed contacts C1*a*,C1*b* to prevent damage to the set of contacts CX.

The set of contacts CX is normally open due to the presence of the armature spring G1 that biases the armature toward its first position. During a "switch-on" operation of the contactor 10, the armature 30 is moved to its second position (FIG. 2) such that the set of contacts CX is closed with the first and second fixed contacts C1*a*,C1*b* respectively engaged by the first and second movable contacts C2*a*,C2*b* so that the movable contact portion C2 electrically connects and completes the circuit between the first and second fixed contacts C1*a*,C1*b* through the movable contact bar C2*c* or otherwise and the electrical power supply circuit line side LS is electrically connected to the load side LD to provide electrical power from the source to drive the load. Conversely, during a "switch-off" operation of the contactor 10, the armature 30 is moved from its second position (FIG. 2) to its first position (FIG. 1) such that the set of contacts CX is opened with the first and second movable contacts C2*a*,C2*b* respectively spaced-apart and disengaged from the respective first and second fixed contacts C1*a*,C1*b* so that the line side LS and load side LD of the power circuit are electrically disconnected or isolated to disconnect the load from the line side LS source of electrical power.

Figures 3, 3A, 3B, 3C:
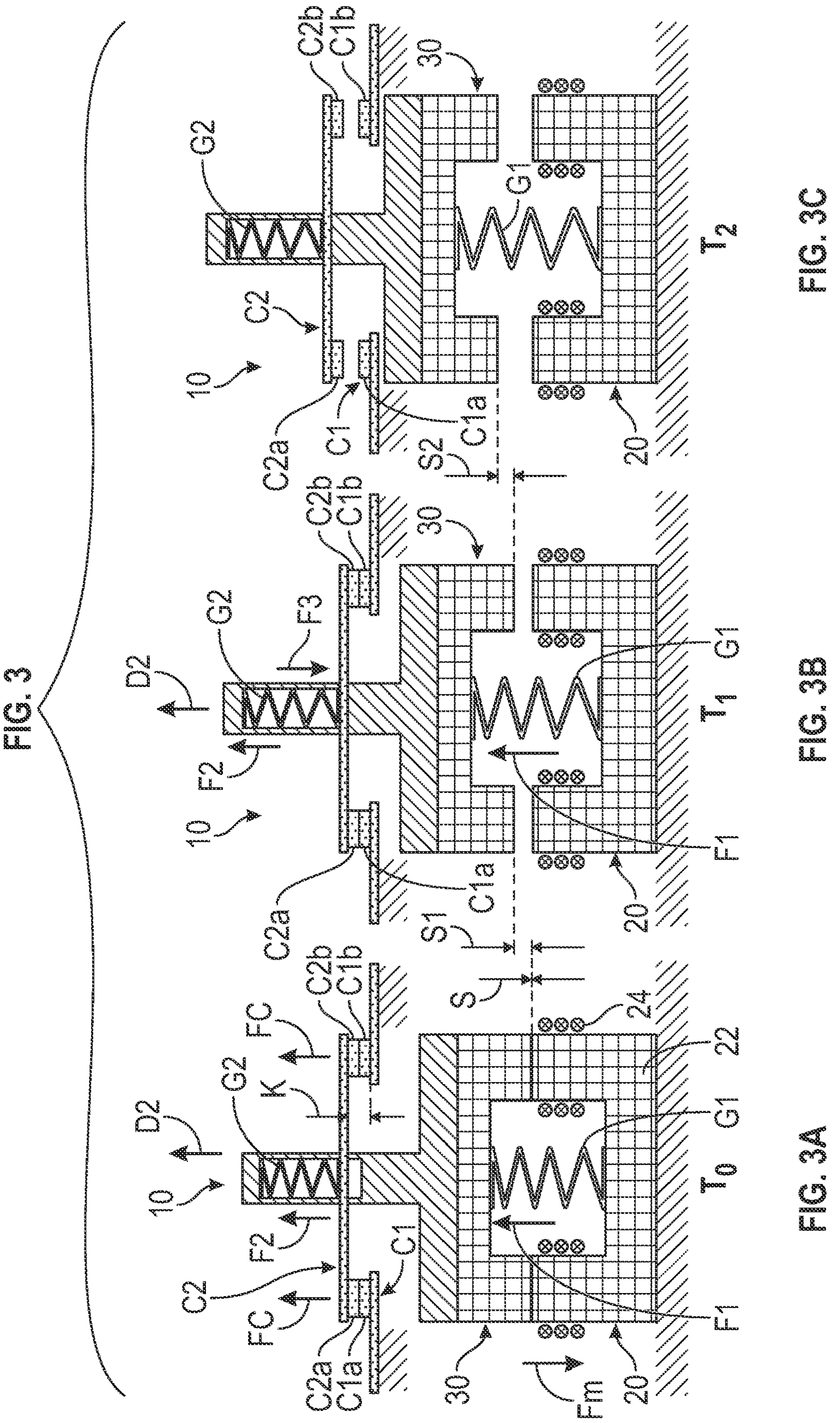
FIG. 3 (including FIGS. 3A,3B,3C) illustrates the contactor of FIGS. 1 & 2 as it changes state from "on" or conducting (FIG. 3A) to "off" or non-conducting (FIG. 3C), wherein the contactor is shown with new or uneroded contacts.

FIGS. 3A, 3B and 3C (together defining FIG. 3) show the contactor 10 at a first contactor life reference time such as when the contactor 10 is new and unused. The contactor 10 thus comprises new (unworn or uneroded or full thickness) contacts C1*a*,C1*b*,C2*a*,C2*b* such that the respectively corresponding first and second contact pairs C1*a*,C2*a* and C1*b*,C2*b* define a combined or overall new (first) contact thickness K. FIG. 3A shows the armature 30 in its second operative position, FIG. 3C shows the armature 30 in its first operative position, and FIG. 3B shows the armature 30 in an intermediate operative position between the second and first operative positions. The sequence of FIGS. 3A, 3B, and 3C thus illustrate a "switch-off" operation of the contactor 10.

With specific reference to FIG. 3A, when the armature 30 is in its second operative position, the armature 30 is also urged or biased in the second direction D2 toward its first operative position by: (i) a first armature biasing force F1 exerted on the armature 30 in the second direction D2 by the armature spring G1; and (ii) a second armature biasing force F2 exerted on the armature 30 in the second direction D2 by the contact spring G2. In reaction to the second armature biasing force F2, a contact force FC acts on each movable contact C2*a*,C2*b* in the second direction D2. In particular, the second armature biasing force F2 of the contact spring G2 is divided across the two mated contact pairs C1*a*,C2*a* and C1*b*,C2*b* such that the contact force FC equals one-half of the second armature biasing force F2 (FC=F2/2). FIG. 3A shows an instant at a time $T_0$ where the coil 24 of the stator 20 has been deenergized and the electromagnetic force Fm of the stator 20 has dropped below the sum of the first and second armature biasing forces F1,F2 (Fm<(F1+F2)) so that the armature 30 begins to move in the second direction D2 away from the stator 20. Since the armature 30 is abutted with the stator 20, an armature displacement S defined between the armature 30 and stator 20 is equal to zero (armature displacement S=0) and this position where the armature 30 is moved fully to its second position can be referred to as a reference position indicating that the armature displacement S equals zero (S=0).

FIG. 3B shows a time $T_1$ after time $T_0$ where the armature 30 is located in an intermediate position between the first position first position (FIG. 3A) and the second position (FIG. 3C) where the armature 30 has moved in the second direction D2 a first displacement distance S1 such that the armature displacement distance S=S1. The first displacement distance S1 corresponds to an instant when the second contacts C2*a*,C2*b* respectively initially separate from the first contacts C1*a*,C1*b* such that Fc=0 and such that the second armature biasing force F2 exerted by the contact spring G2 on the armature 30 is equal to and balanced with an opposite contact force F3 exerted by the contact spring G2 on the movable contact C2/armature 30. At this instant $T_1$ when the contact force first Fc=0 as the armature 30 is moving in the second direction D2, movement of the armature 30 in the second direction D2 is induced only by the first armature biasing force F1 since Fc=0, i.e., from this instant $T_1$ onward, as the armature moves in the second direction D2, the contact spring G2 has no effect on moving the armature 30. Thus, between time $T_0$ and $T_1$, both the armature spring G1 and contact spring G2 urge the armature 30 in the second direction D2, while between time $T_1$ and $T_2$, only the armature spring G1 urges the armature 30 in the second direction D2.

FIG. 3C shows the instant at time $T_2$ when the armature 30 has moved an additional second displacement distance S2 from the position shown in FIG. 3B and has reached its first position and stops moving in the second direction D2. In FIG. 3C, the armature displacement S=S1+S2.

Figures 4, 4A, 4B, 4C:
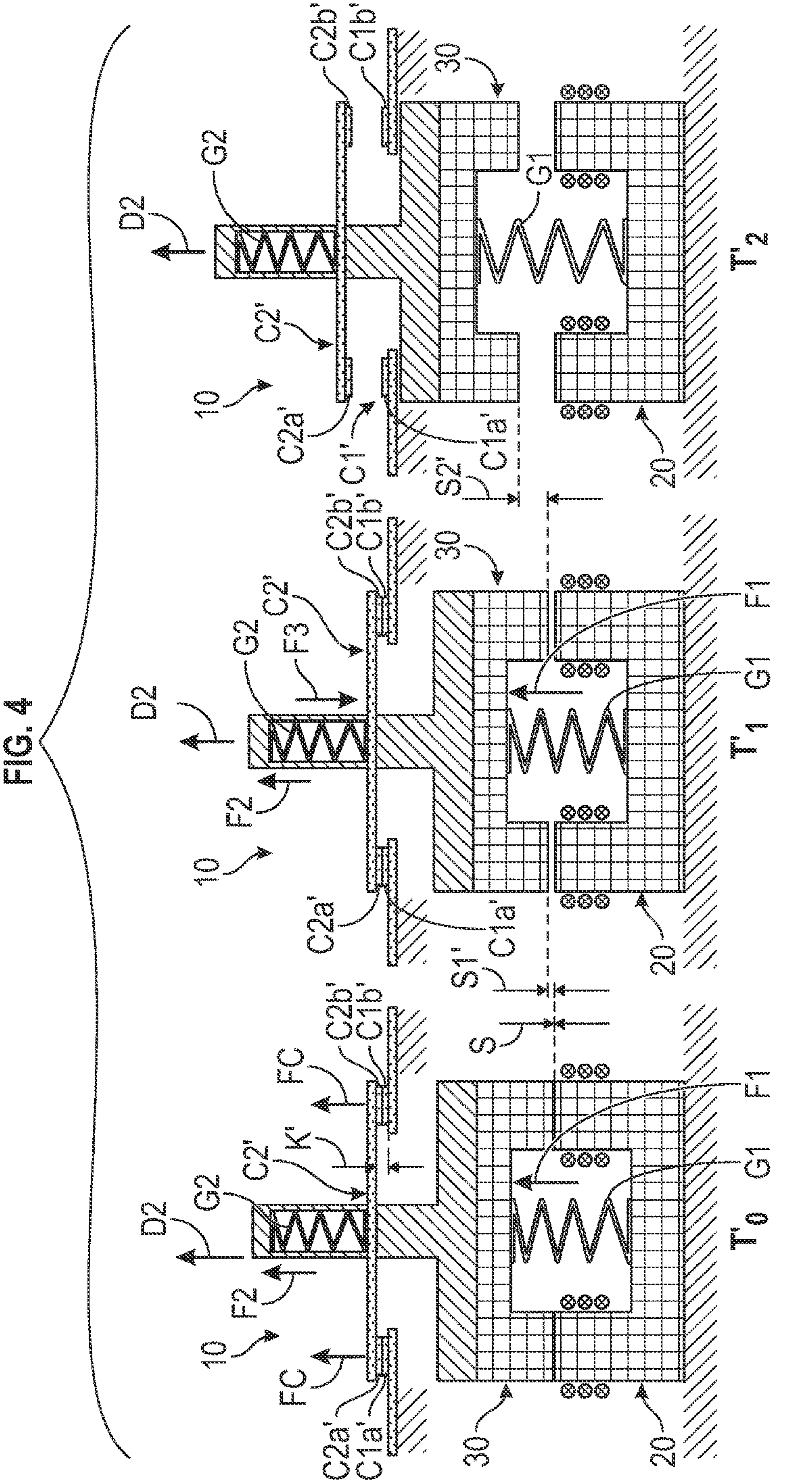
FIG. 4 (including FIGS. 4A,4B,4C) is similar to FIG. 3 but illustrates the contactor of FIGS. 1 & 2 as it changes state from "on" or conducting (FIG. 4A) to "off" or non-conducting (FIG. 4C), wherein the contactor is shown with worn or eroded contacts.

FIGS. 4A, 4B, and 4C correspond respectively to FIGS. 3A, 3B, and 3C but show the same contactor at 10' at a second contactor life reference time after the first life cycle reference time of FIG. 3. The sequence of FIGS. 4A, 4B, and 4C thus illustrate a "switch-off" operation of the contactor 10'. In some cases, like components relative to the contactor 10 are indicated with like reference characters including a primed (') designation to indicate changes such as contact erosion or the like. The time indications $T'_0$,$T'_1$,$T'_2$ used in FIGS. 4A-4C correspond respectively to the time indications $T_0$,$T_1$, $T_2$ of FIGS. 3A-3C and respectively represent the same operative states of the contactor 10' as described above in relation to the contactor 10. Due to use of the contactor over time, the contactor 10' (unlike the contactor 10) comprises eroded contacts C1*a'*,C1*b'*,C2*a'*,C2*b'* such that the respectively corresponding first and second contact pairs C1*a'*,C2*a'* and C1*b'*,C2*b'* define a combined or overall worn (second) contact thickness K' that is less than the first combined contact thickness K (K'<K). For purposes of this explanation, the erosion of the contacts is assumed to be equal across both of the first and second contact pairs C1*a'*,C2*a'* and C1*b'*,C2*b'*. Because the contacts C1*a'*,C1*b'*, C2*a'*,C2*b'* are eroded or worn and have a reduced combined thickness K', the first displacement distance S1' between time $T'_0$ and time $T'_1$ is less than the firsts displacement distance S1 for unworn/uneroded contacts such that S1'<S1. This results from the fact that the eroded movable contact portion C2' is displaced by the eroded fixed contact portion C1' in the second direction D2 relative to the armature a smaller distance as compared to the distance by which the new (uneroded) movable contact portion C2 is displaced by the new (uneroded) fixed contact portion C1. For this same reason, the second displacement distance S2' of FIG. 4C is greater than the second displacement distance S2 of FIG. 3C (S2'>S2) since at time $T_2$, S=S1'+S2'=S1+S2. It should be noted that the change in contact thickness ΔK=K−K'=S1−S1'.

During the contact opening process shown in FIGS. 3A-3C and FIGS. 4A-4C, the acceleration of the armature 30 in the second direction D2 during period beginning at time $T_0$, $T'_0$ and ending at time $T_1$, $T'_1$ can be represented by Equation 1:

$$A1=(F1+F2)/M \quad \text{Equation 1}$$

where A1 represents the acceleration of the armature 30 during period beginning at time $T_0$,$T'_0$ and ending at time $T_1$,$T'_1$ and where M represents the total mass of the armature 30 (including all parts connected to and moving therewith). The acceleration of the armature 30 in the second direction D2 during period beginning at time $T_1$, $T'_1$ and ending at time $T_2$, $T'_2$ can be represented by Equation 2:

$$A2=F1/M \quad \text{Equation 2}$$

where A2 the acceleration of the armature 30 during period beginning at time $T_1$, $T'_1$ and ending at time $T_2$, $T'_2$ and where M represents the total mass of the armature 30 (including all parts connected to and moving therewith). As such, A2 is necessarily less than A1 (A2<A1) which results in a transition point on an acceleration curve of the armature 30 that occurs at time $T_1$ when the acceleration decreases from A1 to A2.

Figure 5:
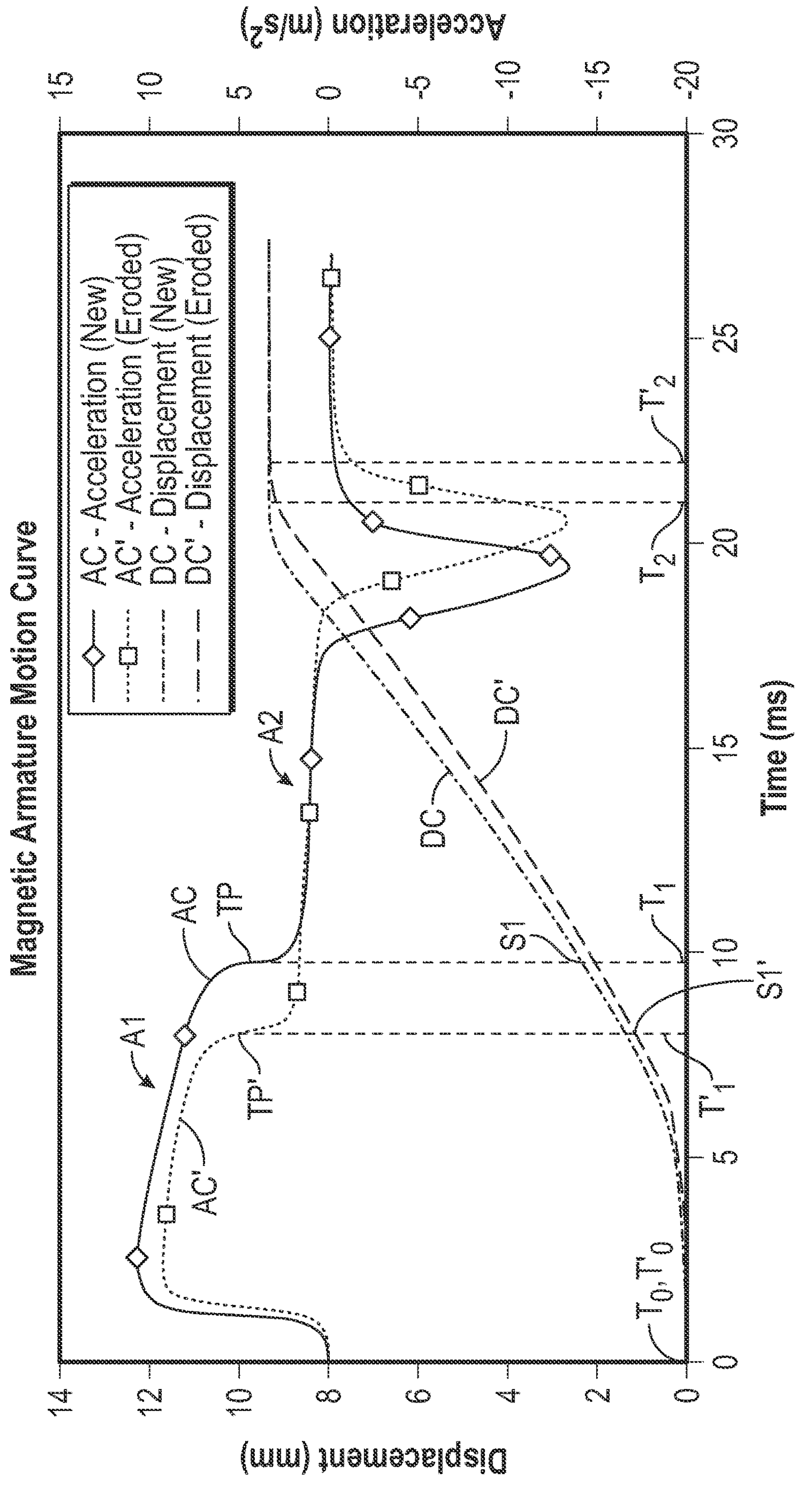
FIG. 5 provides a graph that shows armature acceleration and displacement acceleration curves for a contactor armature with new (uneroded) contacts and worn (eroded) contacts, with time in milliseconds (ms) shown on the horizontal axis, acceleration in meters per second squared (m/s2) shown on the right-side vertical axis, and with the displacement represented in millimeters (mm) on the left vertical axis.

FIG. 5 provides a graph that shows the acceleration curve AC of the armature 30 for the new (uneroded) contact set CX of the contactor 10 and also the acceleration curve AC' of the armature 30 for the worn (eroded) contact set CX' of the contactor 10', with time in milliseconds (ms) shown on the horizontal axis and the acceleration in meters per second squared ($m/s^2$) shown on the right-side vertical axis. It should be noted on the right axis that the acceleration begins at 0 $m/s^2$ at time $T_0$,$T'_0$ for both acceleration curves AC,AC' and ends at 0 $m/s^2$ at time $T_2$,$T'_2$ for the respective acceleration curves AC,AC'. At time $T_1$ (for the acceleration curve AC) and at time $T'_1$ (for the acceleration curve AC'), the acceleration decreases from A1 to A2 at respective transition points TP,TP'

FIG. 5 also shows the armature displacement distance curve DC for a new (uneroded) contact set CX and also a displacement curve DC' for a worn (eroded) contact set CX', with the displacement represented in millimeters (mm) on the left vertical axis. It can be seen in the present example with reference to the left-side axis that the armature displacement S begins at 0 mm at time $T_0$, $T'_0$ for both displacement curves DC,DC' and ends at a non-zero value (between 8 and 10 mm in the present example) for the respective displacement curves DC,DC', but this final displacement distance will vary for each particular contactor 10.

With particular reference to the acceleration curves AC, AC', the change or transition (decrease) in acceleration from acceleration magnitude A1 to acceleration magnitude A2 is shown at TP for the new (uneroded) contact set CX and at TP' for the worn (eroded) contact set CX'. These transition points TP,TP' correspond respectively to the first displacement distances S1,S1' as indicated by the vertical broken lines located at time $T_1$ and $T'_1$, because they occur at the instant that the armature 30 has traveled the first displacement distance S1,S1' at which point the contact spring G2 no longer affects acceleration of the armature 30. Provided that the same methodology is used for both acceleration curves AC,AC', the exact location of the transition point can be fixed using various methods such as by setting the transition point TP,TP' at the instant when the acceleration drops in absolute or percentage terms by more than a select amount in a select time period. For example, the transition points TP,TP' can be set where the acceleration decreases by at least 5 $m/s^2$ in 0.1 ms or, in another example, where the acceleration decreases by at least 5% in 0.1 ms. Of course, these are only non-limiting examples and other acceleration decrease magnitudes and time periods can be used without departing from the scope and intent of the present disclosure.

By determining the acceleration transition points TP,TP', the first displacement distances S1,S1' can be determined by directly or indirectly sensing the armature displacement distances S1,S1' at the times $T_1$,$T'_1$ when the transition points TP,TP' occur. Furthermore, the first displacement distances S1,S1' can be used to derive the change in contact thickness ΔK according to Equation 3:

$$\Delta K = S1 - S1' \qquad \text{Equation 3}$$

Figure 6:
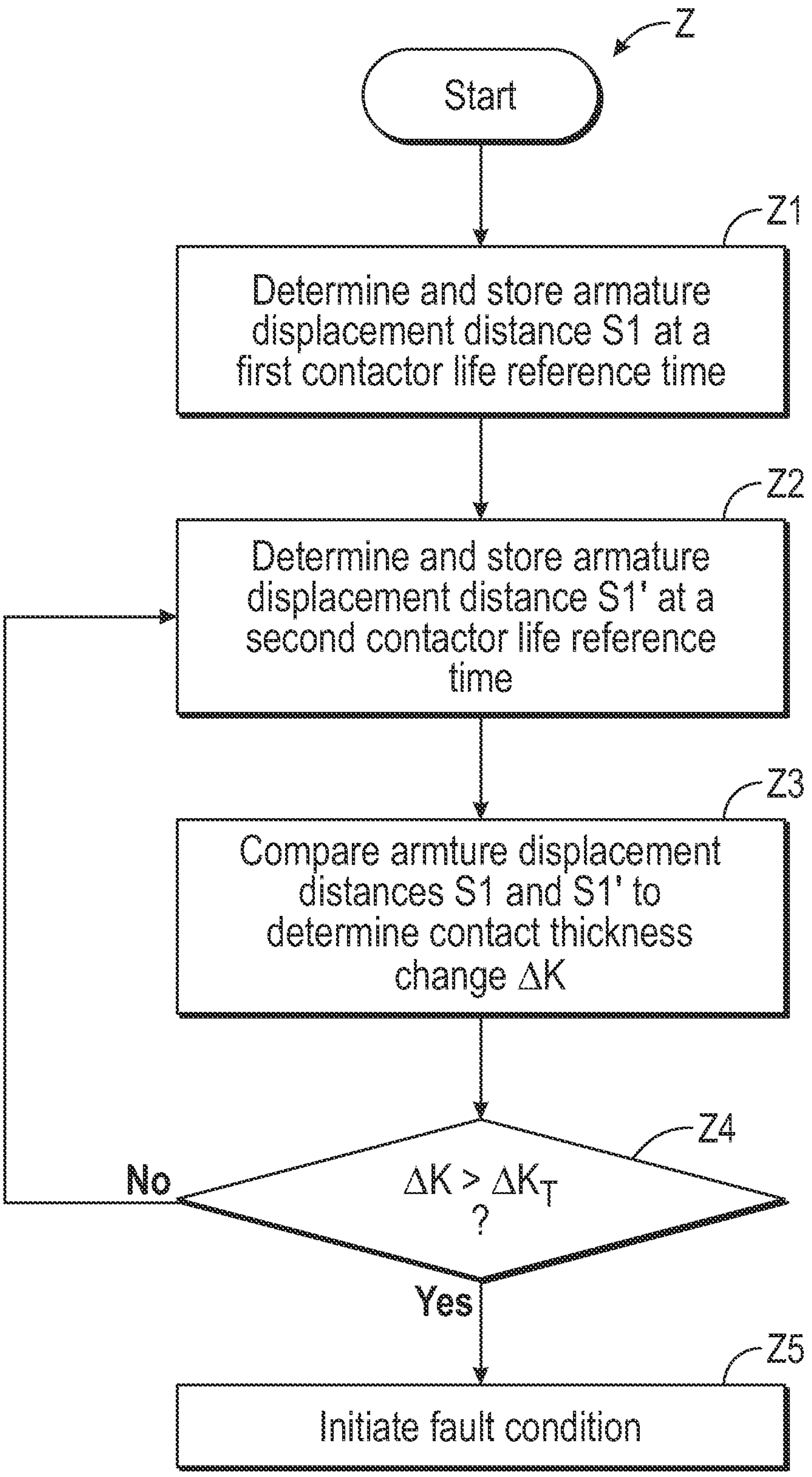
FIG. 6 is a flowchart that discloses a method for determining a change in contact thickness according to one embodiment of the present disclosure.

According to the present disclosure, a method Z for determining the change in contact thickness is provided as generally disclosed in FIG. 6. In a step Z1, the displacement distance S1 at time $T_1$ is determined for a contact set CX of a contactor 10 at a first life reference time such as when the contact set CX is new and uneroded. The displacement distance S1 at the first life reference time is stored or otherwise recorded. The method further includes a step Z2 of determining the displacement distance S1' at time $T'_1$ for the worn contact set CX' of the same contactor 10 (as indicated at 10' in the drawings) at a second life reference time after the first life reference time such as when the contact set CX is used and potentially eroded. The displacement distance S1' at the second life reference time can be stored or otherwise recorded. The method further comprises a step Z3 of comparing the displacement distances S1 and S1' to each other to determine the contact thickness change ΔK such as by subtracting using Equation 3 or otherwise (ΔK=S1−S1'). The method further comprises a step Z4 of comparing the contact thickness change ΔK to a contact thickness change threshold $\Delta K_T$ that has been selected to represent the maximum allowable contact thickness change (erosion) for the contactor 10,10' wherein contact erosion greater than the contact thickness change threshold $\Delta K_T$ indicates a need for replacement of the contactor 10' or replacement of the fixed and/or movable contacts C1',C2' thereof. If the step Z4 determines that the contact thickness change ΔK does not exceed the contact thickness change threshold $\Delta K_T (\Delta K \leq \Delta K_T)$ the method returns to step Z2 to repeat steps Z2-Z4. If the step Z4 determines that the contact thickness change ΔK exceeds the contact thickness change threshold $\Delta K_T (\Delta K > \Delta K_T)$ the method proceeds to step Z5 to initiate a fault condition such as an activating an indicator light or visual display, setting a processing flag, playing a sound, and/or initiating any other electronic or physical indication that the contact thickness change ΔK has exceeded the threshold $\Delta K_T$ and that the contact set CX' of the contactor 10' should be replaced or serviced.

Figure 7:
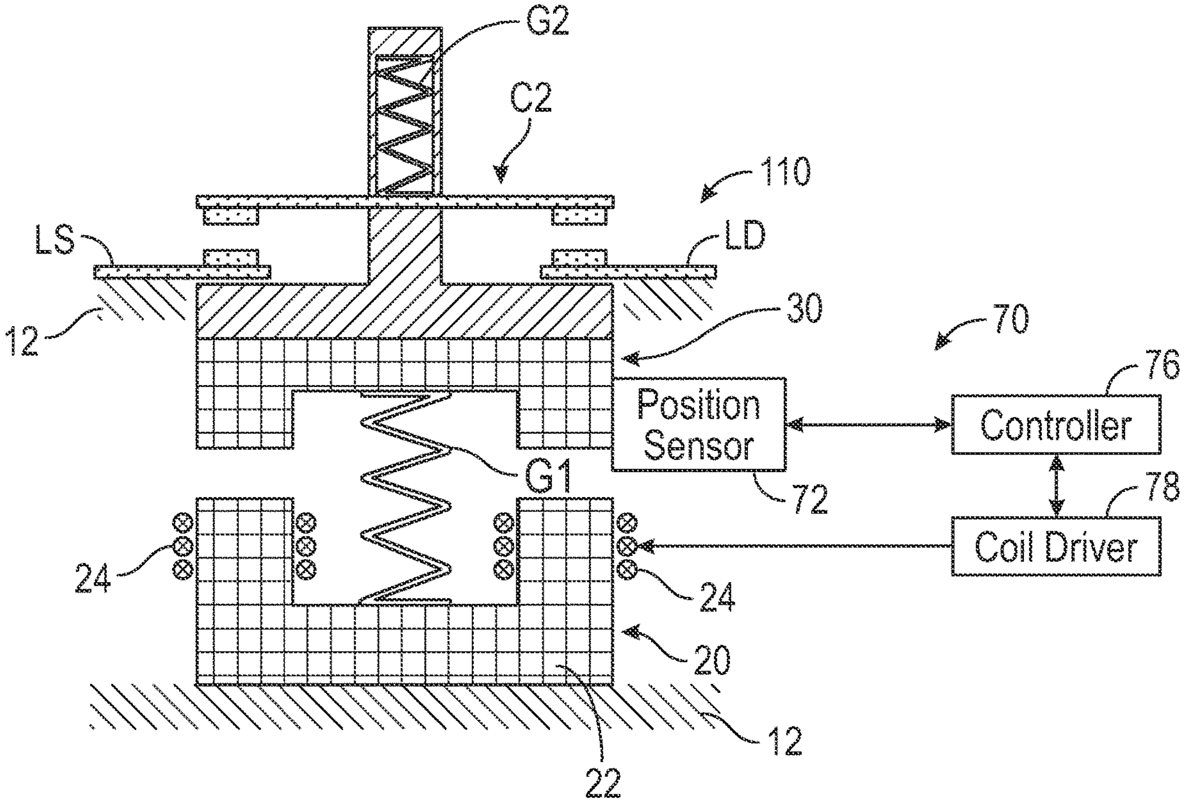
FIG. 7 shows a contactor provided in accordance with an embodiment of the present development including a contactor thickness change determination system.

FIG. 7 shows a contactor 110 provided in accordance with the present development. The contactor 110 is identical to the contactor 10 except that it further comprises a contact thickness change determination system 70 provided in accordance with an embodiment of the present disclosure. Like elements of the contactor 110 relative to the contactor 10 are identified with like reference numbers and reference characters without further explanation. The system 70 can be permanently integrated into the contactor 110 or can comprise a module that is added on to a conventional contactor. The system 70 comprises a position sensor 72 that is connected directly or indirectly to the contactor base 12 so as to be fixed in position relative to the stator 20 and is adapted to sense the position of the armature 30 such as by directly sensing the position of the armature or by sensing the position of another component connected to the armature 30. In one example, the position sensor 72 comprises a Hall-effect sensor that senses the position and/or presence of permanent magnets affixed to and movable with the armature 30. Alternatively, the sensor comprises an optical sensor that optically detects light that is emitted by one or more diodes or other light source(s) connected to the base 12 and/or armature 30 or that optically detects light that is reflected or transmitted by the armature 30 or a component connected to the armature such as a slotted optical grating connected to the armature 30 to move therewith. The position sensor 72 can also comprise an optical scanner scans indicia or other optically detectable features of the armature 30 or a component connected to the armature 30 and that indicates or represents the displacement distance S of the armature. The system 70 further comprises a controller 76 such as a microprocessor or microcontroller that is operably connected to the position sensor 72 to operate the sensor 72 and to receive position data from the position sensor 72 that indicates or represents the displacement S of the armature 30. The controller 76 is also operatively connected to a coil driver circuit 78 that selectively energizes and selectively deenergizes the stator coil 24. In this manner, the controller 76 is away of the operative state (energized or deenergized) of the coil 24 at all times.

In one embodiment, the controller 76 of the system 70 implements the method Z of FIG. 6 for the contactor 110 with the step Z1 being carried out when the contactor 10 and contact set CX is brand new and uneroded or unworn (the first life reference time). The controller 76 further implements the steps Z2-Z4 continuously or periodically over time (each a second life reference time) until the controller 76 determines in the step Z4 that the contact thickness change ΔK exceeds the threshold $\Delta K_T$ at which time the controller 76 executes the step Z5 to initiate a fault condition as described above.

Those of ordinary skill in the art will recognize that the present development provides a method and device for monitoring contact thickness of a contactor over a full life cycle of a contactor 10 and a contact set CX thereof from new to end-of-life such that preventative maintenance of power switches and other contactors is enabled to prevent unplanned outages. Similarly, the present method and device allow for the overall condition of the armature 30 to be monitored over the contactor life cycle to provide information concerning the overall health and condition of the contactor such that a failing contactor can be replaced before failure.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A method for determining contact thickness change in a contactor, said method comprising:

sensing, using a position sensor, a first displacement distance moved by an armature of the contactor from a reference location to a first transition point during a switch-off operation of the contactor at a first contactor life reference time when movable contacts and fixed contacts of said contactor define a first contact thickness;

sensing, using the position sensor, a second displacement distance moved by the armature from the reference location to a second transition point during a switch-off operation of the contactor at a second contactor life reference time after said first contactor life reference time when said movable contacts and said fixed contacts define a second contact thickness that is less than said first contact thickness; and using said first displacement distance and said second displacement distance to determine a contact thickness change between said first contact thickness and said second contact thickness.

2. The method for determining the contact thickness change of claim 1, wherein said step of using said first displacement distance and said second displacement distance to determine said contact thickness change comprises subtracting said second displacement distance from said first displacement distance, wherein said contact thickness change is equal to the difference between said first displacement distance and said second displacement distance.

3. The method for determining the contact thickness change of claim 2, wherein said first contactor life reference time is when said contactor is new and both said movable contacts and said fixed contacts are uneroded, and wherein said second contactor life reference time is when said contactor is used and at least one of said movable contacts and said fixed contacts are eroded.

4. The method for determining the contact thickness change of claim 3, further comprising comparing the contact thickness change to a contact thickness change threshold and initiating a fault condition if said contact thickness change exceeds said contact thickness change threshold.

5. The method for determining the contact thickness change of claim 1, wherein said first transition point is defined where said movable contacts first separate from said fixed contacts at said first contactor life reference time, and wherein said second transition point is defined where said movable contacts first separate from said fixed contacts at said second contactor life reference time.

6. The method for determining the contact thickness change of claim 5, wherein said first transition point and said second transition point are respectively selected based upon a change in acceleration of said armature as said armature moves from a second operative position where said movable contacts are engaged with said fixed contacts toward a first operative position where said movable contacts are separated from said fixed contacts.

7. The method for determining the contact thickness change of claim 1, wherein said first transition point and said second transition point are respectively selected based upon a change in acceleration of said armature as said armature moves from a second operative position where said movable contacts are engaged with said fixed contacts toward a first operative position where said movable contacts are separated from said fixed contacts.

8. The method for determining the contact thickness change of claim 7, wherein said first transition point is defined where said movable contacts first separate from said fixed contacts at said first contactor life reference time, and wherein said second transition point is defined where said movable contacts first separate from said fixed contacts at said second contactor life reference time.

9. The method for determining the contact thickness change of claim 7, wherein said change in acceleration comprises a decrease in acceleration.

10. The method for determining the contact thickness change of claim 9, wherein said decrease in acceleration exceeds a select magnitude in a select time period.

11. The method for determining the contact thickness change of claim 1, wherein said first and second transition points are defined where said armature transitions from a first condition in which said armature is moved by first and second springs to a second condition in which said armature is moved by only said first spring.

12. A contactor, comprising:

a stator comprising a core and windings;

an armature that moves relative to the stator;

fixed contacts that are fixed in position relative to the stator;

movable contacts that move with said armature relative to the stator and that are movable relative to said armature; and a contact thickness change determination system comprising an electronic controller and a position sensor for sensing a position of the armature relative to the stator and providing armature position data to the electronic controller that indicates the position of the armature, wherein said electronic controller is adapted to:

use said armature position data to determine a first displacement distance moved by the armature from a reference location to a first transition point during a switch-off operation of the contactor at a first contactor life reference time when the movable contacts and the fixed contacts of the contactor define a first contact thickness;

use said armature position data to determine a second displacement distance moved by the armature from the reference location to a second transition point during a switch-off operation of the contactor at a second contactor life reference time after said first contactor life reference time when said movable contacts and said fixed contacts define a second contact thickness that is less than said first contact thickness; and use said first displacement distance and said second displacement distance to determine a contact thickness change between said first contact thickness and said second contact thickness.

13. The contactor of claim 12, wherein said electronic controller uses said first displacement distance and said second displacement distance to determine said contact thickness change by subtracting said second displacement distance from said first displacement distance, wherein said contact thickness change is equal to the difference between said first displacement distance and said second displacement distance.

14. The contactor of claim 13, wherein said first contactor life reference time is when said contactor is new and both said movable contacts and said fixed contacts are uneroded, and wherein said second contactor life reference time is when said contactor is used and at least one of said movable contacts and said fixed contacts are eroded.

15. The contactor of claim 12, wherein said electronic controller further compares the contact thickness change to a contact thickness change threshold and initiates a fault condition if said contact thickness change exceeds said contact thickness change threshold.

16. The contactor of claim 12, wherein said first transition point is defined where said movable contacts first separate from said fixed contacts at said first contactor life reference time, and wherein said second transition point is defined where said movable contacts first separate from said fixed contacts at said second contactor life reference time.

17. The contactor of claim 16, wherein said first transition point and said second transition point are respectively selected by said electronic controller based upon a change in acceleration of said armature as said armature moves from a second operative position where said movable contacts are engaged with said fixed contacts toward a first operative position where said movable contacts are separated from said fixed contacts.

18. The contactor of claim 12, wherein said first transition point and said second transition point are respectively selected by said electronic controller based upon a change in acceleration of said armature as said armature moves from a second operative position where said movable contacts are engaged with said fixed contacts toward a first operative position where said movable contacts are separated from said fixed contacts.

19. The contactor of claim 18, wherein said change in acceleration comprises a decrease in acceleration.

20. The contactor of claim 12, further comprising:

an armature spring operably engaged between said stator and said armature that urges said armature toward a first operative position where said movable contacts are separated from said fixed contacts; and a contact spring operably engaged between said armature and said movable contacts that urges said movable contacts toward said fixed contacts, wherein said electronic controller is further adapted to define said first and second transition points where said armature transitions from a first condition in which said armature is moved relative to said stator toward said first operative position by both said armature spring and said contact spring to a second condition in which said armature is moved relative to said stator toward said first operative position by only said armature spring.

* * * * *